Oct. 23, 1934.    W. W. OSLUND    1,977,893
AUTOMATIC MACHINE
Filed June 14, 1933

Inventor.
Walter W. Oslund
By Albert G. Blodgett
Attorney

Patented Oct. 23, 1934

1,977,893

UNITED STATES PATENT OFFICE 1,977,893

AUTOMATIC MACHINE

Walter W. Oslund, Holden, Mass., assignor to The Oslund Brothers Machine Company, Incorporated, Holden, Mass., a corporation of Massachusetts Application June 14, 1933, Serial No. 675,787

7 Claims. (Cl. 198—25)

This invention relates to automatic machines, and more particularly to a machine arranged to affix labels to articles such as glass bottles automatically and at a high rate of speed. This application is a continuation in part of my prior application Serial No. 655,401, filed February 6, 1933.

Bottle labeling machines ordinarily comprise a rotary table on which the bottles are supported during the labeling operation, together with mechanism for delivering the bottles to the table and removing them therefrom automatically. Prior machines in this art have been defective in that the bottles are not held firmly throughout all parts of the cycle and particularly during the interval between the delivery of each bottle to the table and the application of the labels thereto. As a result breakage of bottles frequently occurs, particularly when the machine is stopped suddenly.

It is accordingly one object of the invention to provide a comparatively simple and inexpensive machine which is capable of affixing labels at a very high rate of speed, and which will operate for long periods without attention or repair.

It is a further object of the invention to provide an automatic machine which will hold the bottles or other articles firmly throughout the entire cycle of operation and particularly during the interval immediately following delivery of the articles to the table, thus preventing breakage of the articles in case the machine is suddenly stopped.

With these and other objects in view, as will be apparent to those skilled in the art, the invention resides in the combination of parts set forth in the specification and covered by the claims appended hereto.

Figure 1:
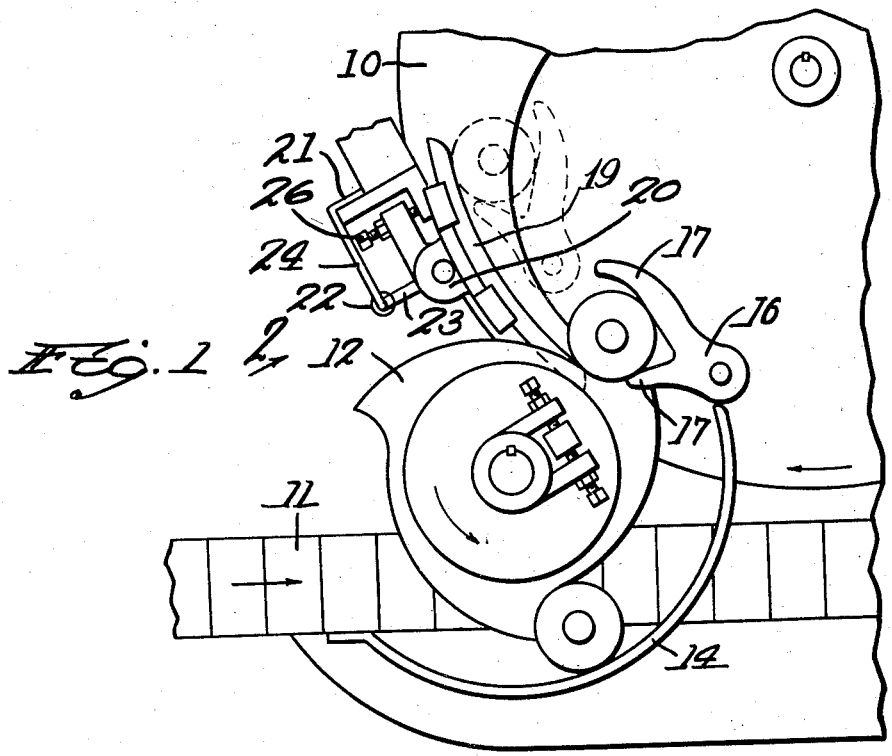
Figure 2:
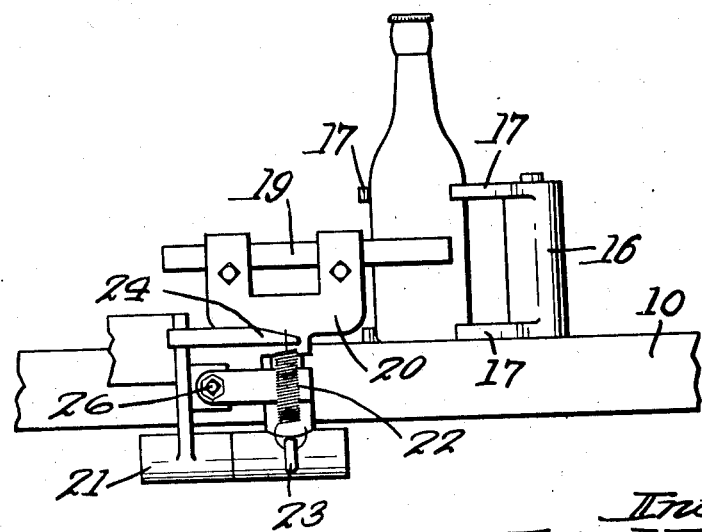

Referring to the drawing illustrating one embodiment of the invention, and in which like reference numerals indicate like parts, Fig. 1 is a top plan view of a portion of a bottle labeling machine; and Fig. 2 is an elevation of the construction shown in Fig. 1.

In the drawing I have shown a machine particularly suitable for affixing labels to glass bottles, but it will be apparent to those skilled in the art that certain features of the invention can be used advantageously in connection with automatic machines in general.

The embodiment illustrated comprises a circular table 10 which is arranged to be rotated in a clockwise direction in Fig. 1. The unlabeled bottles are delivered to the machine by the usual conveyor chain 11, and a turret 12 or other suitable device is provided to transfer the bottles from the chain 11 to the table. The turret 12 is rotated in a counter clockwise direction in Fig. 1. An arcuate guide rail 14 is mounted concentric with the turret and in a position to hold the bottles against the turret as they are carried around thereby.

As each bottle is delivered to the table, it is engaged by a bottle supporting bracket 16 mounted on the table, there preferably being a series of these brackets. Each bracket 16 comprises two vertically spaced and aligned double-pronged forks 17 which extend forwardly and hence are open in the direction of travel. The inner prongs, which are nearer the axis of the table, are shown considerably longer than the outer prongs and prevent movement of the bottles toward the center of the table. Furthermore, the extremities of these inner prongs preferably curve toward the outer prongs, for a purpose which will be made clear hereinafter.

In order to hold the bottles firmly in the brackets 16 as the latter move away from the feed turret, I provide a curved guide rail 19 which is located outside the path of the bottles in a position substantially concentric with the table 10.

The guide rail 19 is preferably yieldably supported, so that it may exert a pressure on the bottles and clamp them firmly in the brackets. For this purpose, the rail is mounted on the upper end of an arm 20, and the lower end of this arm is pivoted to a stationary support 21. The pivotal axis is horizontal and perpendicular to the radius leading to the central portion of the guide rail, so that the rail may swing directly toward the table. The rail is urged in that direction by a tension spring 22 which connects a projection 23 on the arm 20 with a projection 24 on the support 21. The movement of the rail is limited by an adjustable screw 26.

The operation of the invention will now be apparent from the above disclosure. The unlabeled bottles are placed upon the left end of the conveyor chain 11, which is traveling toward the feed turret 12. As the turret rotates it transfers the bottles successively from the conveyor chain to the rotating table 10, where each bottle is engaged by one of the brackets 16. As the bottles are carried away from the turret by the rotation of the table, they contact with the guide rail 19, which holds them firmly in the brackets until label grippers (not shown) have been brought against the bottles. Because of the pressure of the spring 22, and particularly by reason of the curved extremities of the inner prongs of the forks 17, it is impossible for the bottles to slide forwardly out of the brackets or tip over, no matter how suddenly the machine is stopped.

The construction is simple, inexpensive, and effective for the intended purpose.

Having thus described my invention, what I claim as new and desire to secure by Letters Patent is:

1. An automatic machine comprising a rotary table, brackets on the table arranged to support articles, each bracket having a double-pronged fork which is open in the direction of travel, and the inner prongs being curved toward the outer prongs, means to deliver articles to the brackets, and a curved guide rail located outside the path of the articles and cooperating with the inner prongs of the forks to hold the articles in the brackets.

2. An automatic machine comprising a rotary table, brackets on the table arranged to support articles, each bracket having a double-pronged fork which is open in the direction of travel, and the inner prongs being longer than the outer prongs and curved toward the outer prongs, means to deliver articles to the brackets, and a curved guide rail located outside the path of the articles and cooperating with the inner prongs of the forks to hold the articles in the brackets.

3. An automatic machine comprising a rotary table, brackets on the table arranged to support articles, each bracket having a double-pronged fork which is open in the direction of travel, and the inner prongs being longer than the outer prongs and curved toward the outer prongs, a rotary feed turret located adjacent to the table and arranged to deliver articles to the brackets, and a curved guide rail located outside the path of the articles as they leave the feed turret, said guide rail cooperating with the inner prongs of the forks to hold the articles in the brackets.

4. An automatic machine comprising a rotary table, brackets on the table arranged to support articles, each bracket having a double-pronged fork which is open in the direction of travel, and the inner prongs being longer than the outer prongs, means to deliver articles to the brackets, and a yieldably supported curved guide rail located outside the path of the articles, the guide rail being arranged to clamp the articles firmly against the long inner prongs of the brackets.

5. An automatic machine comprising a rotary table, brackets on the table arranged to support articles, each bracket having a double-pronged fork which is open in the direction of travel, and the inner prongs being longer than the outer prongs and curved toward the outer prongs, means to deliver articles to the brackets, and a yieldably supported curved guide rail located outside the path of the articles, the guide rail cooperating with the inner prongs of the forks to hold the articles firmly in the brackets.

6. An automatic machine comprising a rotary table, brackets on the table arranged to support articles, each bracket having a double-pronged fork which is open in the direction of travel, and the inner prongs being longer than the outer prongs and curved toward the outer prongs, means to deliver articles to the brackets, a curved guide rail near the delivery means and substantially concentric with the table, the guide rail being located outside the path of the articles as they leave the delivery means, and yieldable means urging the guide rail toward the center of the table, whereby the guide rail clamps the articles firmly in the brackets.

7. An automatic machine comprising a rotary table, brackets on the table arranged to support articles, each bracket having two vertically spaced and aligned double-pronged forks which are open in the direction of travel, and the inner prongs being longer than the outer prongs and curved toward the outer prongs, means to deliver articles to the brackets, a curved guide rail near the delivery means and substantially concentric with the table, the guide rail being located outside the path of the articles as they leave the delivery means, and yieldable means urging the guide rail toward the center of the table, whereby the guide rail clamps the articles firmly in the brackets.

WALTER W. OSLUND.